Nov. 3, 1942.　　　O. PALMER　　　2,301,076
DUMP CART
Filed March 6, 1942　　　2 Sheets-Sheet 2

Oscar Palmer
INVENTOR.
BY C.A. Knowles

Patented Nov. 3, 1942

2,301,076

UNITED STATES PATENT OFFICE 2,301,076

DUMP CART

Oscar Palmer, Lakeland, Ky.

Application March 6, 1942, Serial No. 433,686

4 Claims. (Cl. 298—19)

This invention aims to provide a dumping vehicle, adapted to be used on small farms, and on agricultural lands which are tilled by the feeble minded or by the patients of institutions, the operation of a dumping vehicle by persons of that class calling for a simple but effective structure.

The invention aims to provide novel means whereby the parts which carry the castor wheels at the rear end of the vehicle may be permitted to swing downwardly, thereby lowering the rear end of the vehicle and bringing about a dumping action, novel means being provided for restoring the device to a working condition.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
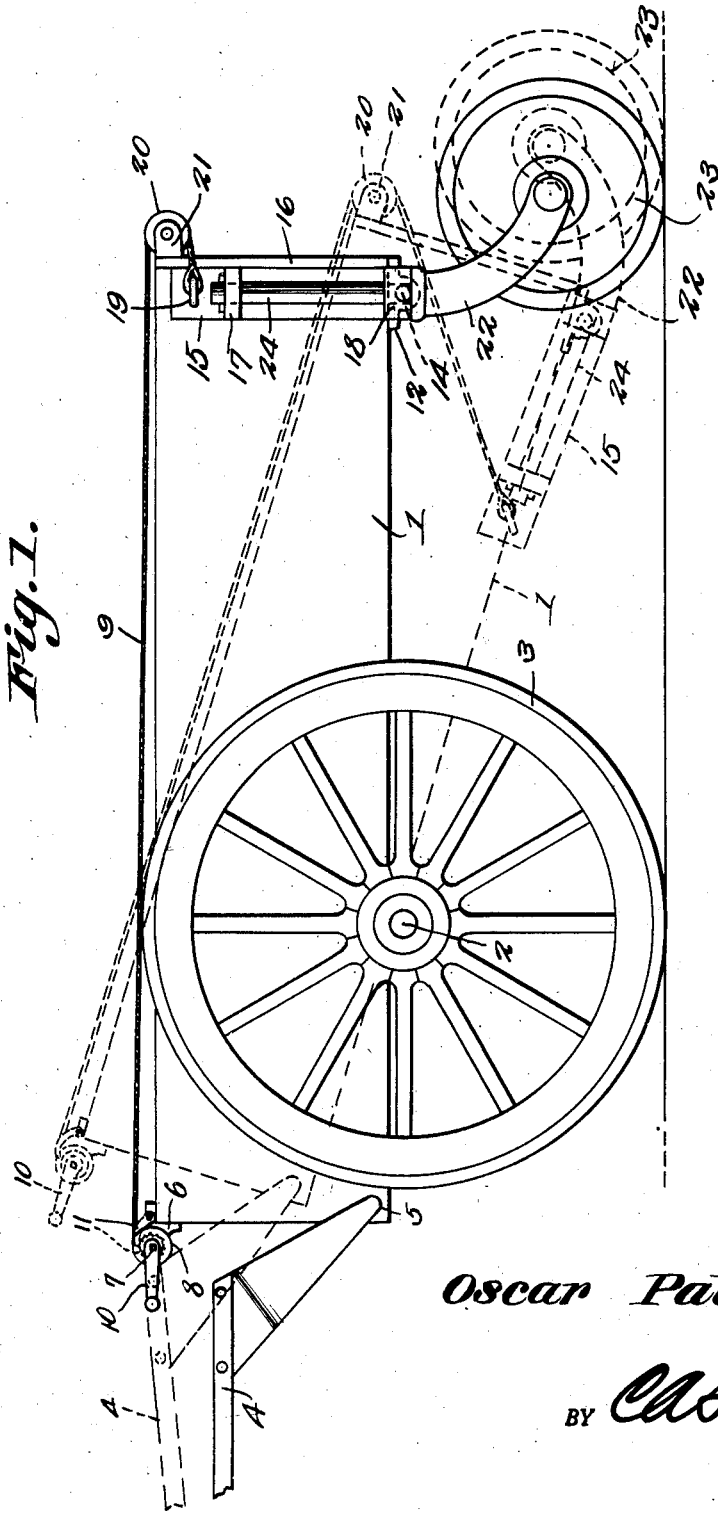
Fig. 1 shows in side elevation, a device constructed in accordance with the invention.
Figure 2:
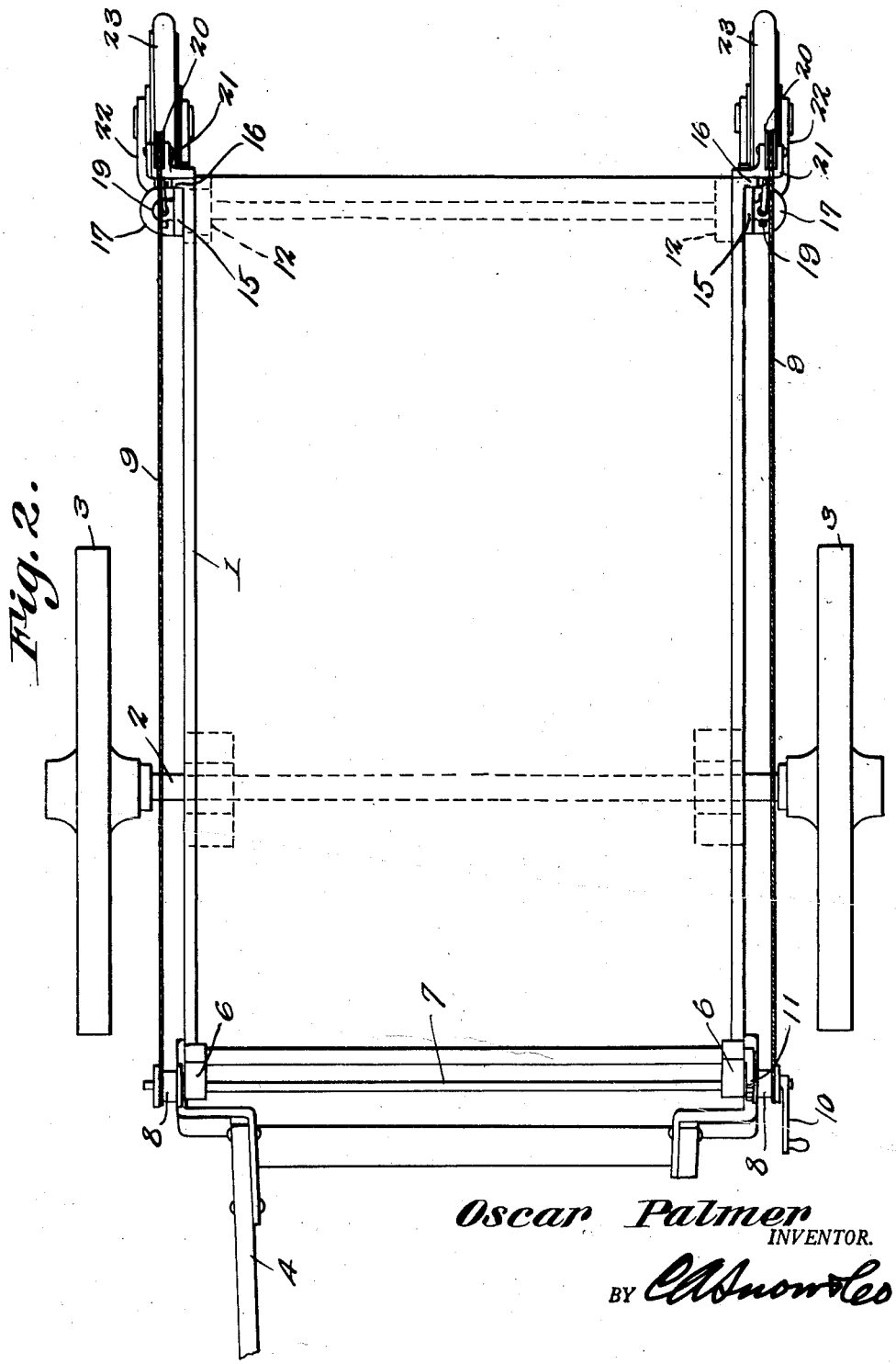
Fig. 2 is a top plan.

In carrying out the invention, there is provided a rectangular, elongated, box-like dump body 1 to which is secured an axle 2 carrying large, forward ground wheels 3, the axle being so located that the rear end of the body will tend to swing downwardly and discharge a load.

Any suitable means may be provided for propelling the vehicle. The drawings disclose a pair of thills 4, pivotally assembled at 5 with the body 1, for vertical swinging movement, although any other equivalent structure may be used.

Bearing brackets 6 are mounted at the upper, forward corners of the body 1, and in them, a horizontal, transverse shaft 7 is journaled for rotation. Spools 8 are fixed to the shaft outside the body 1, rearwardly extended flexible elements 9 being wound about the spools and being secured thereto. The means for rotating the shaft 7 may be of any desired sort, but, in the present instance, a crank 10 is shown secured to one end of the shaft. Retrograde rotation of the shaft 7 is prevented by a pawl and ratchet mechanism 11, comprising parts carried, respectively, by the shaft, and by the body 1, at one side thereof.

Bearings 12 are secured to the bottom of the body 1 and are located closely adjacent to the rear end of the body. In the bearings 12, a horizontal shaft 14 is mounted to rock. Standards 15 are secured to the end portions of the shaft 14, and are located outwardly of the body. When the standards 15 are in a vertical position, they abut against outwardly projecting stop flanges 16 on the side walls of the body 1. The standards 15 are provided with outwardly projecting upper bearings 17, and with outwardly projecting lower bearings 18, the bearings 18 being disposed at the lower ends of the standards.

Near their upper ends, the standards 15 are supplied with outwardly projecting anchorage eyes 19, to which the flexible elements 9 are secured. Intermediate their ends, flexible elements 9 pass over pulleys 20, supported at 21 on the side walls of the body 1, at the rear end thereof.

Rearwardly curved, forked frames 22 are provided, small castor wheels 23 being supported for rotation in the frames. The frames 22 have vertical shafts 24, mounted to rock about vertical axes in the bearings 17 and 18 of the standards 15.

In practical operation, assuming that the device is in the solid line position of Fig. 1, the pawl and ratchet mechanism 11 is thrown out, and the shaft 14 is reversely rotated, by means of the crank 10, the flexible elements 9 paying off the spools 8. The flexible elements 9 run over the pulleys 20, and the frames 22 swing downwardly and rearwardly, as shown in dotted line in Fig. 1, a downward and rearward slant being given to the body 1, so that it will discharge its contents.

By a reverse operation, the standards 15 are swung upwardly into vertical positions, into abutments with the stop flanges 16, and the vehicle is restored to the solid line showing of Fig. 1.

Having thus described the invention, what is claimed is:

1. A dumping vehicle comprising a body, main ground wheels carrying the body for downward and rearward tilting movement by gravity, a standard pivoted intermediate its ends on the rear portion of the body for vertical swinging movement, a castor wheel, means for carrying the castor wheel at the lower portion of the standard, abutment means on the body and engageable by the standard when the body is in load-holding position, and mechanism under the control of an operator for holding the standard releasably engaged with the abutment means.

2. A dumping vehicle constructed as set forth in claim 1, and wherein said mechanism comprises a member remote from the rear end of the body and supported on the body for rotation at the will of an operator, a direction-changing idler mounted for rotation on the rear portion of the body, and a flexible element connected at its forward end to the rotatable member and at its rear end to the standard and looped in its intermediate portion about the idler.

3. A dumping vehicle comprising a body, main ground wheels carrying the body for downward and rearward tilting movement by gravity, a standard pivoted intermediate its ends on the rear portion of the body for vertical swinging movement, abutment means on the body, and engageable by the standard when the body is in load-holding position, mechanism under the control of an operator for holding the standard releasably engaged with the abutment means, a shaft journaled on the standard for rotary movement about an axis which is substantially vertical when the body is in load-holding position, and a castor wheel carried by the lower part of the shaft.

4. In a dumping vehicle, a body having abutments, main ground wheels carrying the body for downward and rearward movement by gravity, a first shaft mounted on the lower portion of the body, near the rear end thereof, and transversely of the body, standards carried intermediate their ends by the first shaft, for vertical swinging movement, and located at the sides of the body, upright shafts journaled on the standards, castor wheels carried by the lower portions of the upright shafts, a third shaft disposed transversely of the body and journaled on the forward portion of the body, means under the control of an operator for rotating the third shaft, direction changing idlers on the rear portion of the body, and flexible elements wound about the third shaft and connected to the standards, the flexible elements being engaged intermediate their ends by the idlers, the flexible elements constituting means for holding the standards in engagement with the abutments, and being releasable, to permit the castors to move rearwardly, thereby bringing about a downward and backward tilting movement of the body to load-discharging position.

OSCAR PALMER.